(No Model.)  2 Sheets—Sheet 1.
A. T. BALLANTINE.
DOPE CUP.
No. 361,916. Patented Apr. 26, 1887.
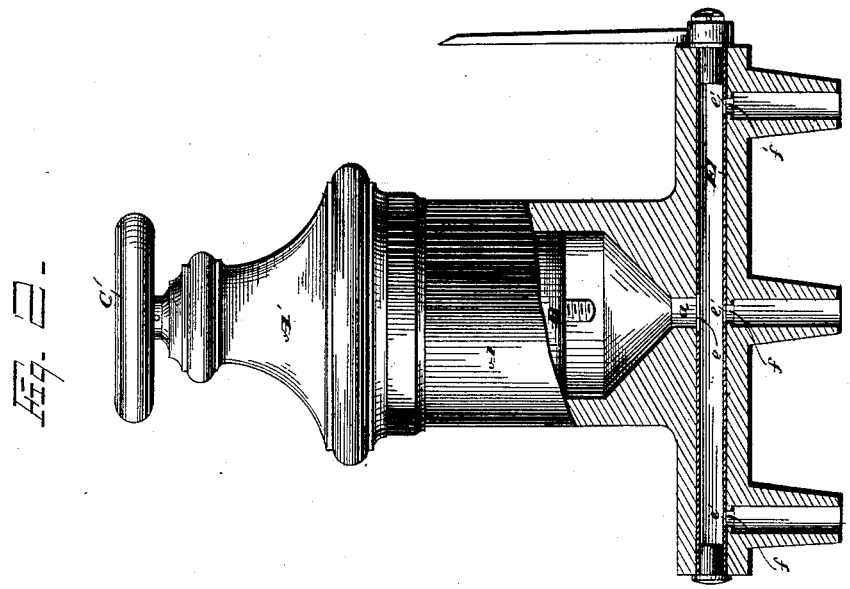
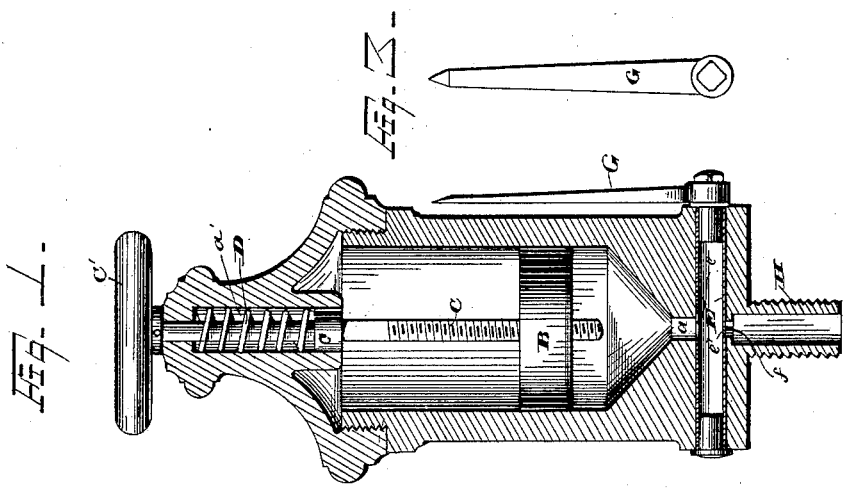
WITNESSES
Alexander T. Ballantine
INVENTOR
Attorneys (No Model.) 2 Sheets—Sheet 2.
A. T. BALLANTINE.
DOPE CUP.
No. 361,916. Patented Apr. 26, 1887.
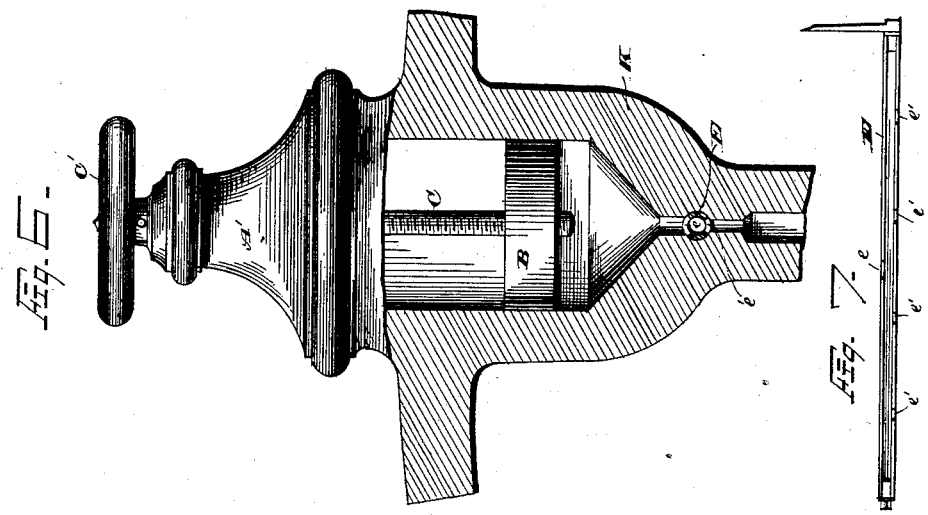
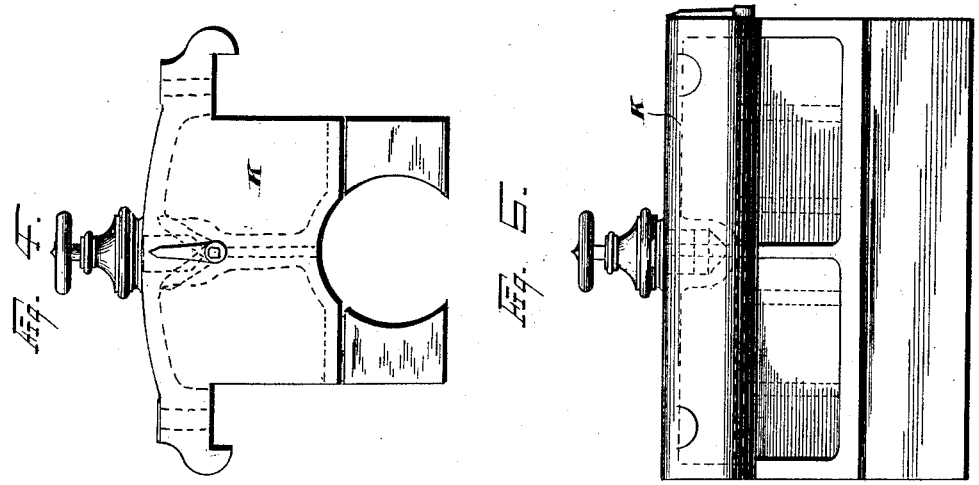
WITNESSES
INVENTOR
Alexander T. Ballantine
Attorneys

UNITED STATES PATENT OFFICE.

ALEXANDER T. BALLANTINE, OF CLEVELAND, OHIO.

DOPE-CUP.

SPECIFICATION forming part of Letters Patent No. 361,916, dated April 26, 1887.

Application filed January 16, 1886. Serial No. 188,746. (No model.)

*To all whom it may concern:*

Be it known that I, ALEXANDER T. BALLANTINE, of Cleveland, in the county of Cuyahoga and State of Ohio, have invented certain new and useful Improvements in Dope-Cups; and I do hereby declare the following to be a full, clear, and exact description of the invention, such as will enable others skilled in the art to which it pertains to make and use the same.

My invention relates to improvements in that class of dope-cups in which a piston operated by a spring and screw-rod is had for forcing the dope from the cup.

My invention consists in a tube arranged across the discharge-outlet of the cup, said tube having an opening for receiving and one or more openings for discharging dope, with a handle attached to said tube for turning the same to graduate the discharge-opening of the tube, so as to control the discharge of dope therefrom.

With these objects in view my invention consists in certain features of construction, and in combination of parts, hereinafter described, and pointed out in the claims.

In the accompanying drawings, Figure 1 is an elevation in section of my improved dope-cup. Fig. 2 is an elevation, partly in section, showing the cut-off tube extended, forming a distributing-tube. Figs. 3 and 7 illustrate details. Figs. 4 and 5 are respective end and side elevations; and Fig. 6, an elevation in section, showing my improved dope-cup built in the cap of a journal-box.

A represents the oil-cup, having a detachable cover, A', and a discharge-orifice, *a*.

B is a piston having a centrally-threaded hole that engages the screw-threads on the rod C. This rod extends up through a socket, *a'*, of the cover, and has attached outside the hand-wheel C'. A coil-spring, D, is mounted on the rod, and engages above the collar *c* of the rod, and above abuts the end wall of the socket *a'*. By turning the rod to force the piston upon the dope the rod is backed out, thereby compressing the spring, the recoil of the latter giving a continuous pressure of the piston on the dope.

E is a tube arranged across the outlet *a*. This tube has an opening, *e*, of considerable size, for receiving the dope, and has one or more discharge-orifices, *e'*, of smaller size than the opening *e*. Openings *f* below register with the openings *e'*. A lever, G, or other suitable device, is connected with the tube for turning the same for more or less cutting off the openings *f*, or forming graduated openings for the discharge of the dope from the tube. The opening *e*, being larger than the openings *e'* and *f*, is always open, so that the tube is always filled with dope.

If but one discharge-opening *e'* is had, the openings *f* may extend through a screw-threaded nozzle, H, as shown in Fig. 1, for attaching the cup. When more than one discharge-opening is required to distribute the dope, the nozzles may be arranged as shown in Fig. 2, and are supposed to enter corresponding holes in the cap of the journal-box.

For larger journal-boxes—such, for instance, as are commonly used on engines—the cup is conveniently built in the cap K, as shown in Figs. 4, 5, and 6, and as many discharge-outlets from the tube may be had as is considered necessary to distribute the dope along the journal-box.

The supply of lubricant to a journal-box cannot always be regulated and controlled automatically. For instance, in starting the machinery, when the journal-box is cold, the lubricant feeds slowly, and as the box warms up the lubricant will feed too fast unless regulated by hand; also, different lubricants feed more or less freely and require regulating. Sometimes a journal-box becomes heated, and an extra amount of lubricant is required at once. With an intelligent operator, my improved device is easily manipulated to regulate the discharge of lubricant as may be required.

I make no claim in this application, broadly, to a spring-actuated screw-rod located within the cup, and a plunger adjustably secured on said screw-rod, as the same forms the subject-matter of my pending application, Serial No. 187,783, filed December 15, 1885.

What I claim is—

1. The combination, with a cup, piston-rod having a screw-threaded end, a spring for forcing the rod downwardly, and a piston secured on the screw-threaded end of the piston-rod, of a tube arranged across the discharge-outlet of the cup and having inlet and outlet openings, and means for turning the tube to graduate the outlet-opening of the tube, substantially as set forth.

2. The combination, with a dope-cup having an adjustable piston for forcing the dope from the cup and a discharging-outlet, of a tube extending laterally, said tube having an orifice for receiving dope from the outlet of the cup, discharge-outlets from the tube, and arrangement for turning the tube to graduate such discharge-outlets, substantially as set forth.

In testimony whereof I sign this specification, in the presence of two witnesses, this 28th day of December, 1885.

ALEXANDER T. BALLANTINE.

Witnesses:
ALBERT E. LYNCH,
CHAS. H. DORER.